Sept. 25, 1934.                G. B. WILLCOX                1,974,906
                            TIRE DEFLATION INDICATOR
                              Filed Oct. 24, 1928

INVENTOR
George B. Willcox

UNITED STATES PATENT OFFICE 1,974,906

TIRE DEFLATION INDICATOR

George B. Willcox, Saginaw, Mich.

Application October 24, 1928, Serial No. 314,580

3 Claims. (Cl. 177—311)

This invention is a tire deflation indicator for automobiles and other vehicles whose wheels are equipped with pneumatic tires.

The invention involves the fact that the tires of a vehicle when inflated to the same extent will possess effective radii of the same length, but partial or total deflation of a tire will shorten its effective radius, so that in traveling a given distance, or at a given speed in miles per hour, the partly deflated wheel will make more revolutions in the distance, or, in the other case, more revolutions per minute than the wheels with undeflated tires.

The principle on which my invention operates is that it produces an electric, hydraulic, pneumatic or equivalent impulse at each revolution of each of two wheels, or several times per revolution, or once in every so many revolutions, as conditions may require, and it transmits those impulses by appropriate means to an indicating device, carried by the vehicle, capable of indicating changes in the relative impulse frequencies and consequently in the rates of revolution of the said two wheels.

An object of the invention is thus attained, namely, that the occupants of the vehicle shall have timely warning, visual or audible, that a tire is going flat, which one, and the approximate amount of its deflation.

An object of the invention is to provide means whereby such indications can be given either continuously during the traveling of the vehicle, or only occasionally and at the will of the driver.

The structural details of the indicating device may be made to suit the requirements of the particular case, and the indicator as well as the wheel actuated impulse producer may be adapted for operation electrically, pneumatically, hydraulically or otherwise without departing from my invention as set forth in certain of the claims.

With the foregoing and certain other objects in view which will appear later in the specification, my invention comprises the devices described and claimed and the equivalents thereof.

In the drawing Fig. 1 is a diagrammatic view of an automobile showing the general arrangement of the connections, in this case electrical, between the wheels and the indicator.

For purposes of description I have chosen an embodiment of my invention wherein the indicator is actuated by electrical impulses transmitted through contacts made intermittently at each wheel, and in this case one contact per revolution. Each wheel is provided with a contact-making device 1 of any suitable kind adapted to complete a circuit through a source of current 2, such as a battery, and an indicator 3. Preferably two wheels are operatively connected to one indicator so that the impulses from a wheel tend to counteract the impulses from another wheel so long as they are both revolving at the same rate, but when one is greater than the other the pointer 3a on the indicator moves to the right or to the left.

Figure 4:
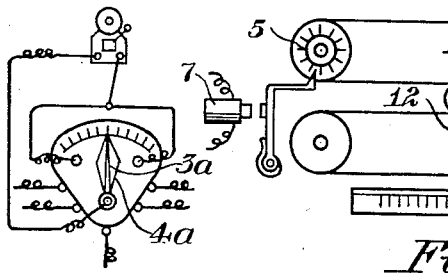
Fig. 4 is a diagrammatic view showing the dial face of an electrically actuated indicator; also showing a means for operating an audible signal upon deflation of a tire.
Figure 1:
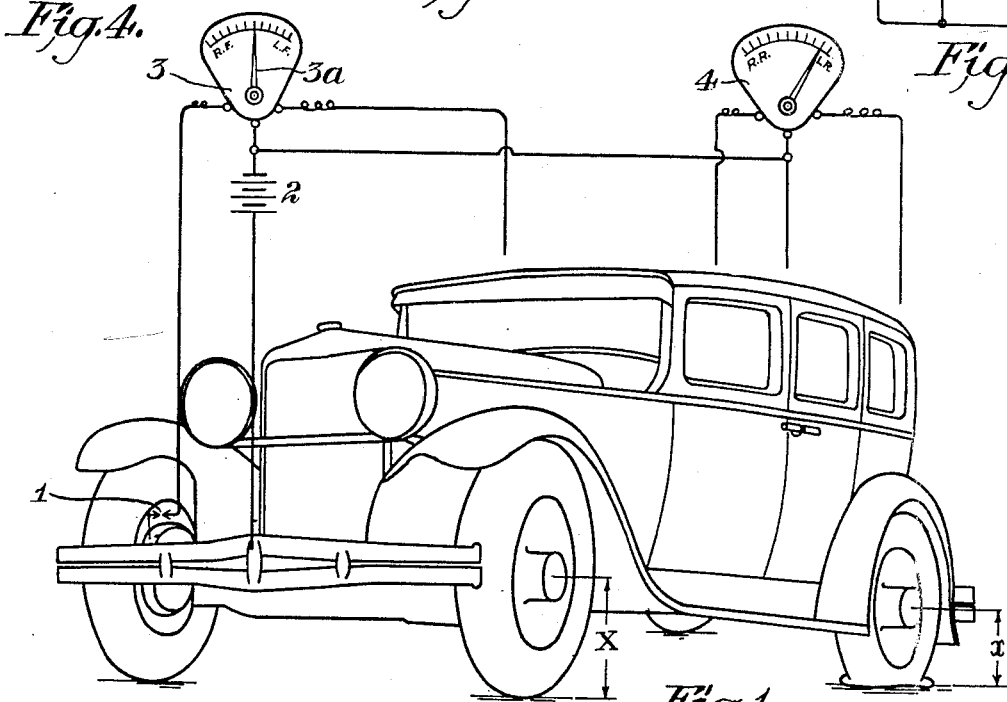
Figure 2:
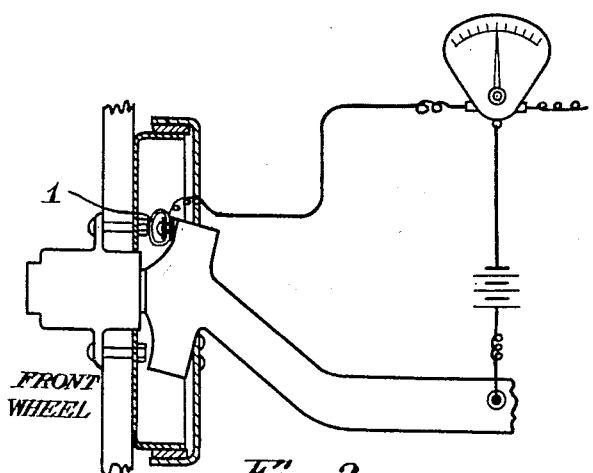
Fig. 2 is a part sectional diagrammatic view showing an electrical contact arrangement for the front wheel of an automobile equipped with a brake.

In Fig. 1 the left rear tire is shown deflated, its effective diameter having decreased from X to $x$. I have shown here two front wheels connected to the indicator 3 and two rear wheels connected to another indicator 4. These two indicators may be combined in one instrument, as shown in Fig. 4, where 3a and 4a are two pointers of different shapes or colors whose positions coincide at the zero point of the dial under normal conditions, but one or the other pointer will depart from the zero position to the right or left when a tire on one wheel begins to go flat. The specific internal mechanism of the electrical indicator is not shown herein because the details of it are not essential to my claimed invention. It is only necessary that the indicating device be arranged to operate automatically by impulses derived from rotation of the wheels, or from movement of some part connected to them, and that the device be adapted to indicate changes in the relative frequencies of the two sets of impulses.

Figure 5:
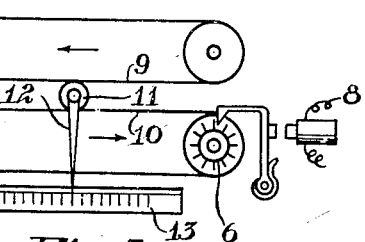
Fig. 5 is a diagrammatic front view of a mechanically operated indicator actuated by electromagnets.

In Fig. 5 a modified form of the indicating device is shown diagrammatically, where ratchet wheels 5 and 6 are operated by magnets 7 and 8, the wheel 5 propelling a belt or band 9 in one direction and the wheel 6 propelling an adjacent band 10 in the other direction, an idle roller 11 located between and contacting with both bands and carrying a pointer 12 adapted to travel along an indicator scale 13. So long as the impulse frequencies of magnets 7 and 8 are at the same rate, the speed of travel of the bands 9 and 10 will be equal and consequently roller 11 remains in its central position and pointer 12 indicates normal or zero on scale 13. If differences occur in the relative speeds of revolution of the two wheels to which magnets 7 and 8 are respectively connected, occasioned by an abnormal change in the effective diameter of a wheel due to the escape of air from its tire, that wheel increases its rate of revolution with respect to the other wheel connected with the same indicator, and pointer 12 travels to the right or left along scale 13, showing not only which wheel is affected, but the relative amount of the deflation.

If one of the two wheels connected to an indicator is equipped with a tire having a worn tread, and is in consequence of slightly smaller diameter than its companion wheel, the normal zero point on scale 13 can be maintained by appropriately increasing or decreasing the diameter of one of the belt wheels, shown in Fig. 5, to cause one belt to travel slightly faster than the other.

In like manner similar compensations and adjustments can be applied to any other type of indicating device by means well known to makers of instruments of this character.

Figure 6:
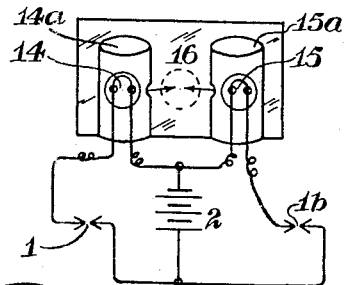
Fig. 6 is a diagrammatic front view of an indicator operating by visible flashes of different colored lights.

In Fig. 6 is shown a still further modification of the indicator, where 1 and 1b indicate the contact points of any two wheels of a vehicle, and 14, 15 are electric bulbs encased in hoods 14a, 15a, adapted to project their light through apertures and illuminate a spot on a screen 16. The lights being of different colors and projected against the same spot, or closely adjacent spots on the screen, their relative frequencies can be accurately judged by the observer. As the frequency of flashes of one color increase due to the deflation of the tire, the signal is at once apparent and the proper wheel is indicated by the increased frequency of the particular color appropriate to it.

As above stated, the wheel contacts may be made one at each revolution, or more than one, or less than one, as circumstances and the kind of indicator employed may require. Instead of electrical impulses, mechanical impulses may be transmitted by means of small mechanically actuated pumps to transmit fluid impulses through tubes to suitable devices for indicating changes in the relative rate of revolution of any two wheels, without departing from my invention as claimed.

Figure 3:
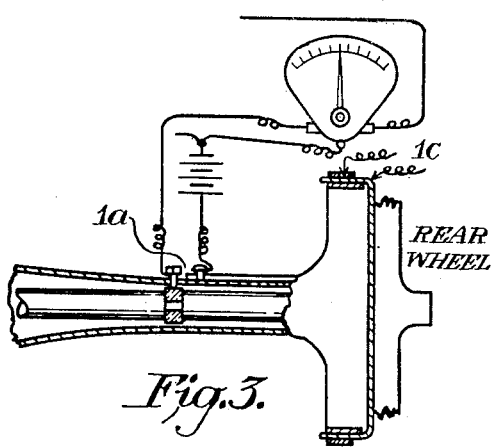
Fig. 3 is a similar view showing diagrammatically a contact arrangement applied to a revolvable rear axle.

The impulses may be made to operate continuously while the vehicle is in motion, or if desired the contact members may be so mounted that the indications will be made only at the will of the operator, for example, when he presses lightly upon the brake pedal and slightly moves the brake band with respect to the drum and thereby puts contact members into operation. In that case one contact member would be located on the brake band and the co-operating contact member on the brake drum, as indicated at 1c in Fig. 3.

Having thus described my invention, what I claim and desire to secure by Letters Patent, is:

1. In combination with a device for comparing the air pressures in pneumatic tires mounted on different wheels of a vehicle responsive to the movement of said wheels, a light screen on the vehicle, sources of light of contrasting color, means for projecting beams of light from said sources to the screen, light-actuating means operatively connecting each of said sources of light and a wheel of the vehicle, and an interrupter associated with each wheel and operative to produce a flash in each source of light at each operation of its associated vehicle wheel, the arrangement being such that variations in the frequency of said respective flashes effect changes in the appearance of the light screen and thereby produce signals indicating changes in the relative speeds of rotation of said wheels.

2. A signal device comprising a light screen, a plurality of sources of light differing from one another in color, each source being adapted to project a beam of light onto said screen, means for flashing each light independently, means for effecting relative changes in the flashing frequencies of said lights, whereby to alter the aspect of the signal on the screen.

3. A structure as set forth in claim 2 wherein the means for effecting relative changes in the flashing frequencies of said lights comprises switch elements in circuit with the respective lights and operatively connected to wheels that are subject to relatively variable rates of rotation.

GEORGE B. WILLCOX.